(12) United States Patent
Jung et al.

(10) Patent No.: US 12,194,911 B2
(45) Date of Patent: Jan. 14, 2025

(54) VEHICLE LAMP

(71) Applicant: SL Corporation, Daegu (KR)

(72) Inventors: Jin Young Jung, Gyeongsan-si (KR); Jun Tae Kim, Gyeongsan-si (KR); Chang Deok Seo, Gyeongsan-si (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 18/525,750

(22) Filed: Nov. 30, 2023

(65) Prior Publication Data
US 2024/0190330 A1    Jun. 13, 2024

(30) Foreign Application Priority Data
Dec. 8, 2022  (KR) .......... 10-2022-0170513

(51) Int. Cl.
*B60Q 1/04*     (2006.01)
*F21S 41/20*    (2018.01)
*F21S 41/32*    (2018.01)

(52) U.S. Cl.
CPC .............. *B60Q 1/04* (2013.01); *F21S 41/285* (2018.01); *F21S 41/32* (2018.01)

(58) Field of Classification Search
CPC ................................. F21S 41/24; F21S 41/285
See application file for complete search history.

(56) References Cited

U.S. PATENT DOCUMENTS

| | | | | |
|---|---|---|---|---|
| 10,082,272 | B2 * | 9/2018 | Gromfeld | F21S 41/265 |
| 10,704,764 | B2 * | 7/2020 | Veenstra | F21V 5/04 |
| 10,801,688 | B2 * | 10/2020 | Wang | F21S 41/62 |
| 11,619,362 | B1 * | 4/2023 | Lee | F21S 41/43 |
| | | | | 362/511 |
| 2022/0186898 | A1 | 6/2022 | Lee | |

FOREIGN PATENT DOCUMENTS

| | | |
|---|---|---|
| KR | 10-2022-0011394 A | 1/2022 |
| KR | 10-2022-0083481 A | 6/2022 |
| KR | 10-2022-0133529 A | 10/2022 |

* cited by examiner

*Primary Examiner* — Matthew J. Peerce
(74) *Attorney, Agent, or Firm* — United One Law Group LLC; Kongsik Kim; Jhongwoo Peck

(57) ABSTRACT

A vehicle lamp that achieves a slim design while forming an optimal beam pattern generates a beam pattern using a plurality of lamp modules. The plurality of lamp modules are arranged in one direction, and each of the plurality of lamp modules includes a light source that generate light; an optical guide unit, which guides incident light from the light source to be emitted forward; and an optical lens, which transmits the incident light from the optical guide unit therethrough to allow the beam pattern to be generated.

20 Claims, 11 Drawing Sheets

VEHICLE LAMP

CROSS-REFERENCE TO RELATED APPLICATION

This application claims priority from Korean Patent Application No. 10-2022-0170513 filed on Dec. 8, 2022, which is incorporated herein by reference in its entirety.

BACKGROUND

1. Technical Field

The present disclosure relates to a vehicle lamp, and more particularly, to a vehicle lamp that achieves a slim design while forming an optimal beam pattern.

2. Description of the Related Art

Generally, a vehicle is equipped with various lamps that serve illumination functions to facilitate the observation of objects around the vehicle during low-light conditions (e.g., nighttime driving) and signaling functions to inform other vehicles or road users about the vehicle's operational status.

For instance, headlamps and fog lamps primarily serve the purpose of illumination, while turn signal lamps, tail lamps, and brake lamps primarily serve the purpose of signaling. The installation criteria and specifications for each lamp are regulated to ensure that each function is adequately fulfilled.

Recently, vehicle lamps play a significant role not only in ensuring driver visibility for safe operation but also in enhancing aesthetic aspects that consumers perceive, thereby exerting a considerable influence on vehicle purchase decisions.

To achieve this, research is actively underway to enable vehicle lamps to possess a slimmer exterior design while still forming optimal beam patterns.

SUMMARY

Aspects of the present disclosure provide a vehicle lamp that achieves a slim exterior design by forming a beam pattern through multiple lamp modules arranged in one direction.

Aspects of the present disclosure also provide a vehicle lamp that prevents glare for the driver of an oncoming vehicle.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, a vehicle lamp may include a plurality of lamp modules to generate a beam pattern therewith. The plurality of lamp modules may be arranged in one direction (e.g., a vertical direction), and each of the plurality of lamp modules may include a light source that generates light; an optical guide unit, which guides the light incident from the light source to be emitted forward; and an optical lens, which transmits the light incident from the optical guide unit therethrough to allow the beam pattern to be generated.

The optical guide unit may include an entrance section, through which the light is incident from the light source; an exit section, which is disposed in front of the entrance section to allow at least some of the light incident upon the entrance section to exit; and a transmission section, which transmits the light incident upon the entrance section to the exit section.

The entrance section may include a central surface, which is centered around an optical axis of the light source; a protruding surface, which protrudes toward the light source from edges of the central surface; and a reflective surface, which reflects at least some of light incident on the protruding surface forward.

The exit section may have a convex shape toward the front of the vehicle lamp.

The optical guide unit may further include a shield section, which is formed with a concave shape on a bottom surface of the transmission section, and an upper part of the shield section may be disposed at or near a rear focal point of the exit section.

The optical guide units of the plurality of lamp modules may be integrally formed, and an aperture may be formed between the optical guide units of adjacent lamp modules among the plurality of lamp modules for forming the shield section at the aperture.

A width of the aperture may gradually (e.g., substantially monotonically) increase in a left-right direction.

The upper part of the shield section may include a first edge portion and a second edge portion, which are formed with different heights on both sides of an optical axis of the light source; and a connecting portion, which connects the first edge portion and second edge portion. The first edge portion and the second edge portion may be formed horizontally.

The upper part of the shield section may further include a protruding portion, which protrudes upward from the second edge portion, the protruding portion may include a third edge portion and a fourth edge portion, which are arranged in a left-right direction, the third edge portion may be disposed closer than the fourth edge portion to the connecting portion, and the third edge portion and the fourth edge portion may be sloped, such that their abutting ends are disposed higher than the second edge portion, and the other ends are connected to the second edge portion.

The fourth edge portion may be formed to be wider than the third edge portion in the left-right direction.

An inclination angle of the third edge portion may be greater than an inclination angle of the fourth edge portion with respect to the second edge portion.

The optical lenses of the plurality of lamp modules may be integrally formed to provide a continuous entrance surface without steps formed across the continuous entrance surface.

Longitudinal lengths of the optical guide units of the plurality of lamp modules may increase along the one direction in which the plurality of lamp modules are arranged.

At least one of the optical guide units of the plurality of lamp modules may have a different position in a left-right direction from at least one other of the optical guide units of the plurality of lamp modules.

According to the aforementioned and other embodiments of the present disclosure, by integrally forming the components of the plurality of lamp modules, which are arranged in one direction, the effect of achieving a slim exterior design can be provided.

Additionally, the effect of preventing glare for the driver of an oncoming vehicle can be achieved by forming a segment of a cutoff line that corresponds to the position of the approaching vehicle to be depressed.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims. Throughout the specification, like reference numerals in the drawings denote like elements.

In some embodiments, well-known steps, structures and techniques will not be described in detail to avoid obscuring the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Embodiments of the disclosure are described herein with reference to plan and cross-sectional illustrations that are schematic illustrations of exemplary embodiments of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but should be construed to include deviations in shapes that result, for example, from manufacturing. In the drawings, respective components may be enlarged or reduced in size for convenience of explanation.

Hereinafter, the present disclosure will be described with reference to the accompanying drawings for describing a vehicle lamp according to embodiments of the present disclosure.

Figure 1:
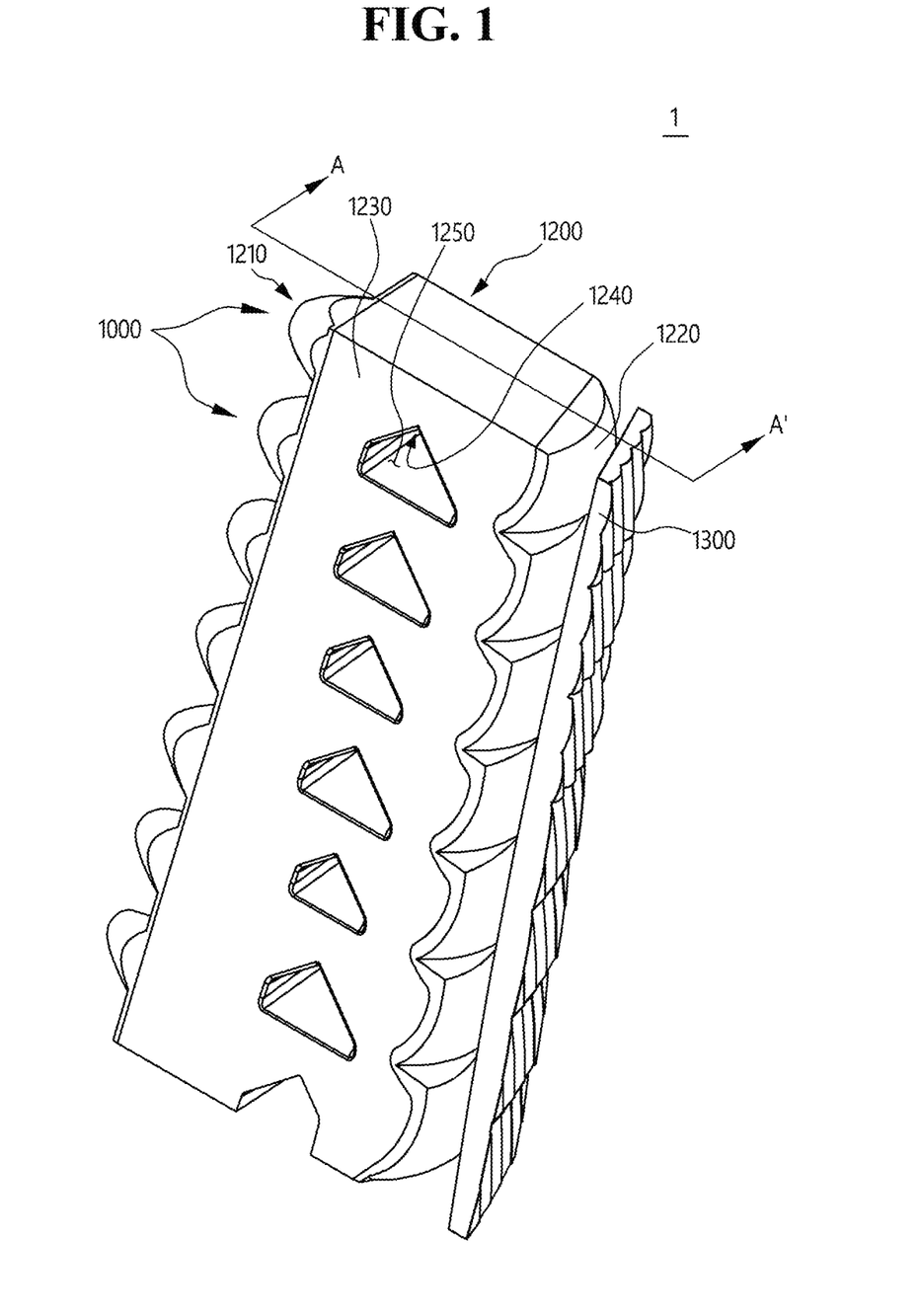
FIGS. 1 and 2 are perspective views of a vehicle lamp according to an embodiment of the present disclosure.
Figure 2:
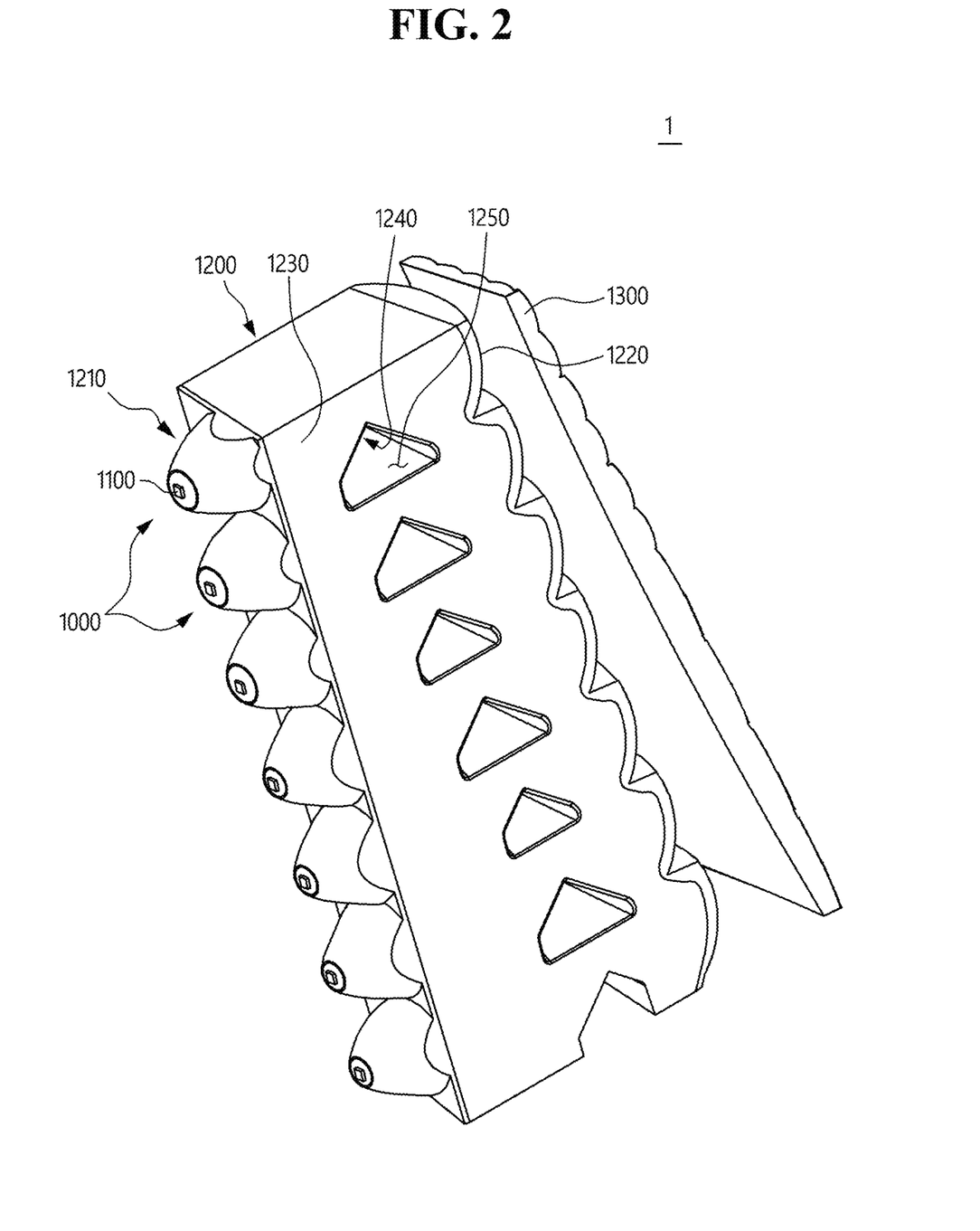
Figure 3:
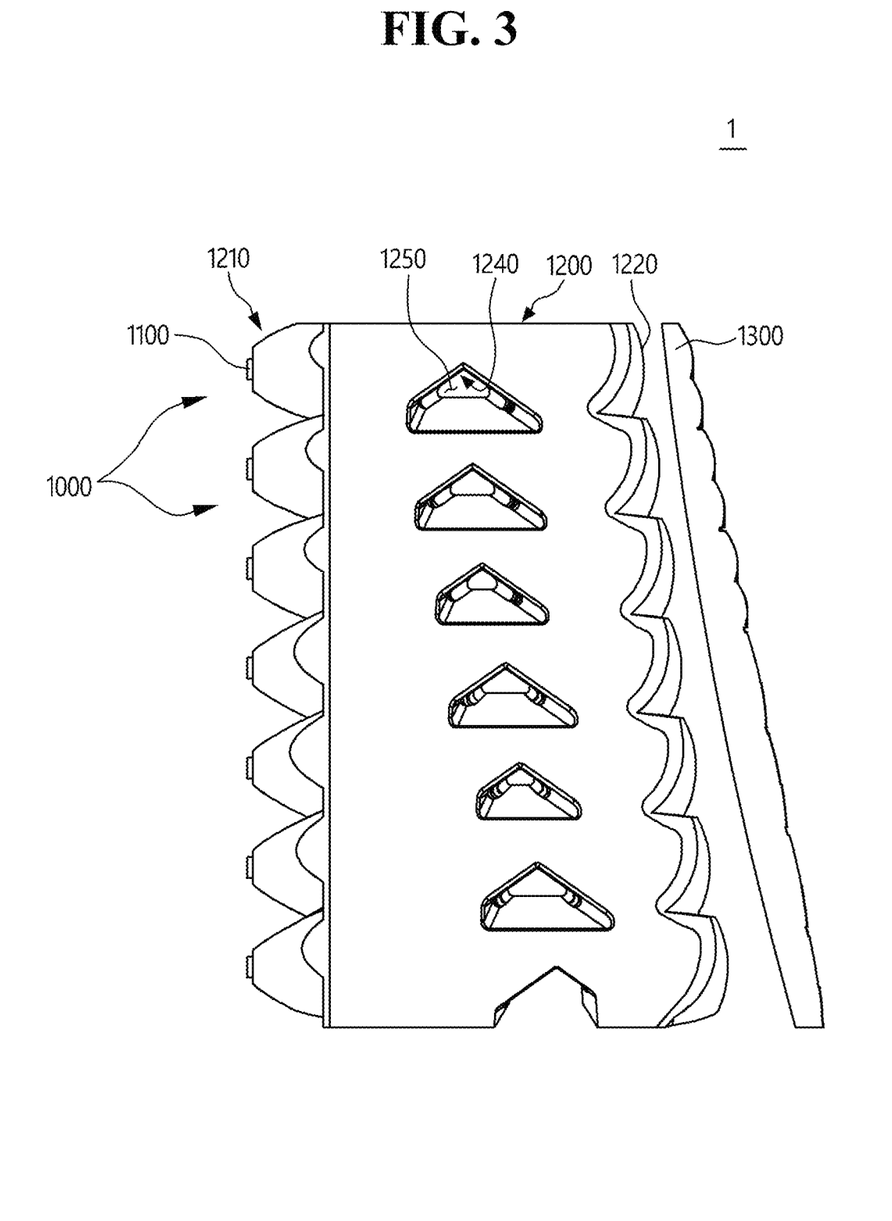
FIG. 3 is a side view of the vehicle lamp according to an embodiment of the present disclosure.
Figure 4:
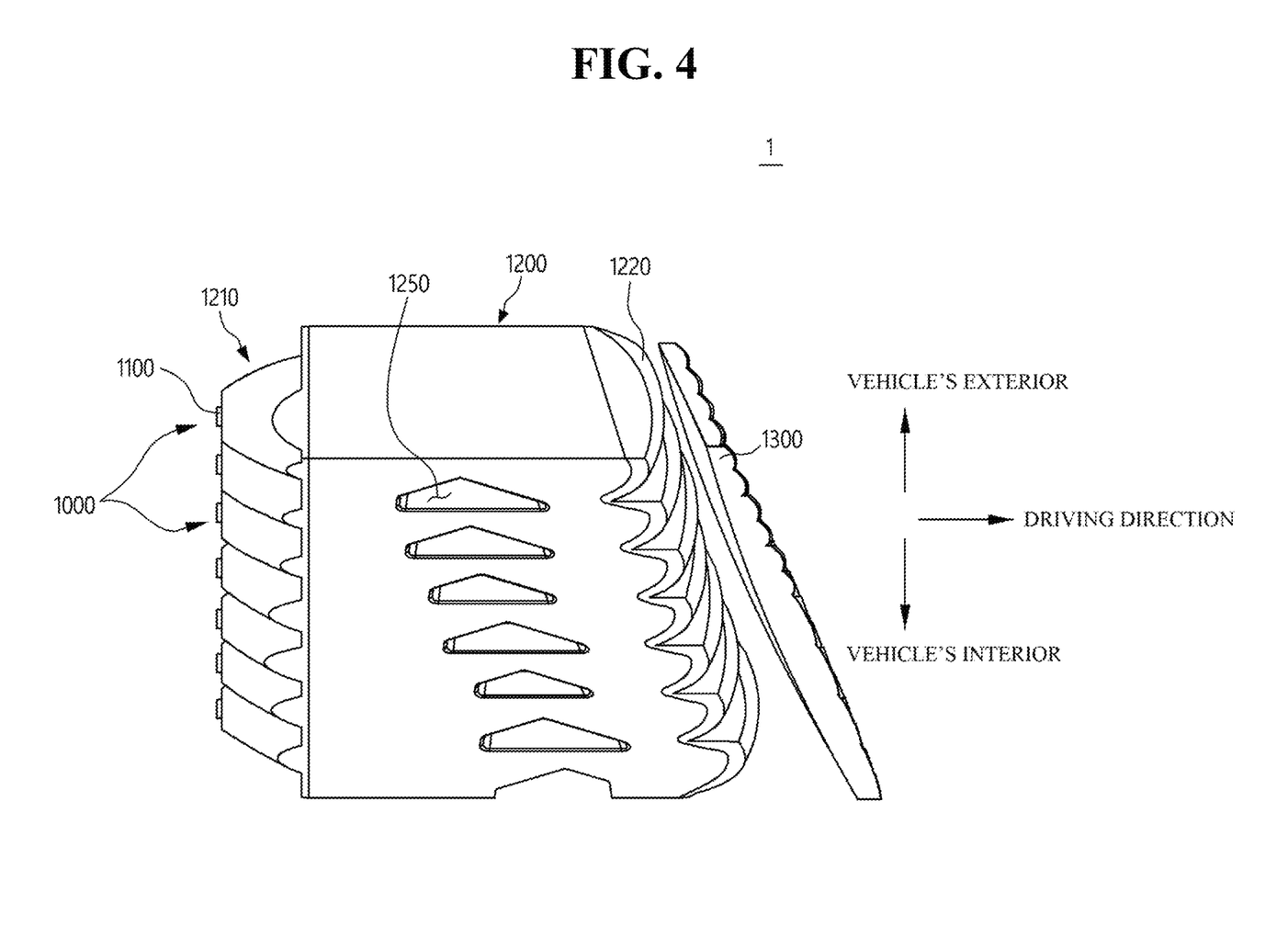
FIG. 4 is a plan view of the vehicle lamp according to an embodiment of the present disclosure.
Figure 5:
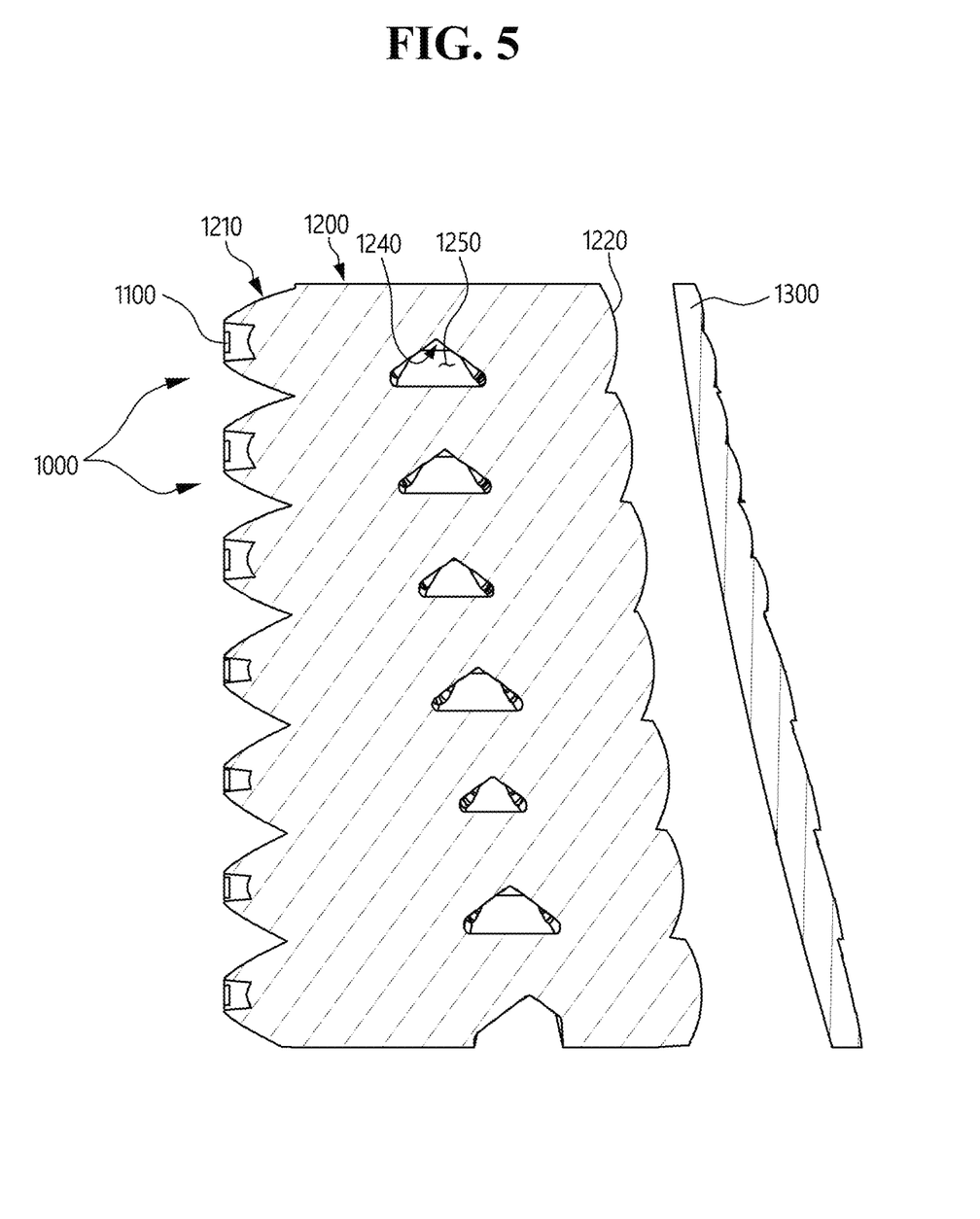
FIG. 5 is a cross-sectional view taken along line A-A' of FIG. 1.

FIGS. 1 and 2 are perspective views of a vehicle lamp according to an embodiment of the present disclosure, FIG. 3 is a side view of the vehicle lamp according to an embodiment of the present disclosure, FIG. 4 is a plan view of the vehicle lamp according to an embodiment of the present disclosure, and FIG. 5 is a cross-sectional view taken along line A-A' of FIG. 1.

Referring to FIGS. 1 through 5, a vehicle lamp 1 may include a plurality of lamp modules 1000, and the beam patterns formed by the lamp modules 1000 may collectively generate a suitable beam pattern for the intended purpose of the vehicle lamp 1.

For convenience, the vehicle lamp 1 will hereinafter be described as being for use as, for example, a headlamp to ensure forward visibility during low-light conditions (e.g., nighttime driving), but the present disclosure is not limited thereto. The vehicle lamp 1 may also serve various other lamp functions of vehicles, including, but not limited to, tail lamps, brake lamps, turn signal lamps, fog lamps, backup lamps, and position lamps.

When used as a headlamp, the vehicle lamp 1 may produce a low beam pattern that ensures a wide field of vision for nearby areas in front of the vehicle by directing light downward below a cutoff line to prevent glare for the drivers of front vehicles such as preceding vehicles or oncoming vehicles. Additionally, the vehicle lamp 1 may generate a high beam pattern that extends the field of view to distant areas in front of the vehicle. Hereinbelow, the vehicle lamp 1 that generates a low beam pattern will be described by way of example.

The plurality of lamp modules 1000 may be arranged in at least one direction depending on the layout or design of the vehicle lamp 1. Hereinbelow, the plurality of lamp modules 1000 will be described as being arranged in a vertical direction by way of example, which allows for the realization of a slimmer exterior form factor.

The beam pattern produced by the vehicle lamp 1 may result from the overlap of identical sub-beam patterns generated by the plurality of lamp modules 1000, or from the combination of different sub-beam patterns generated by different lamp modules among the plurality of lamp modules 1000.

For example, in a case where the vehicle lamp 1 generates a low beam pattern, identical low beam patterns formed by the lamp modules 1000, each including a high-intensity region and a spread region, may be configured to overlap with one another. Alternatively, a high-intensity region formed by one of the lamp modules 1000 and a spread region formed by another one of the lamp modules 1000 may be synthesized together.

Figure 6:
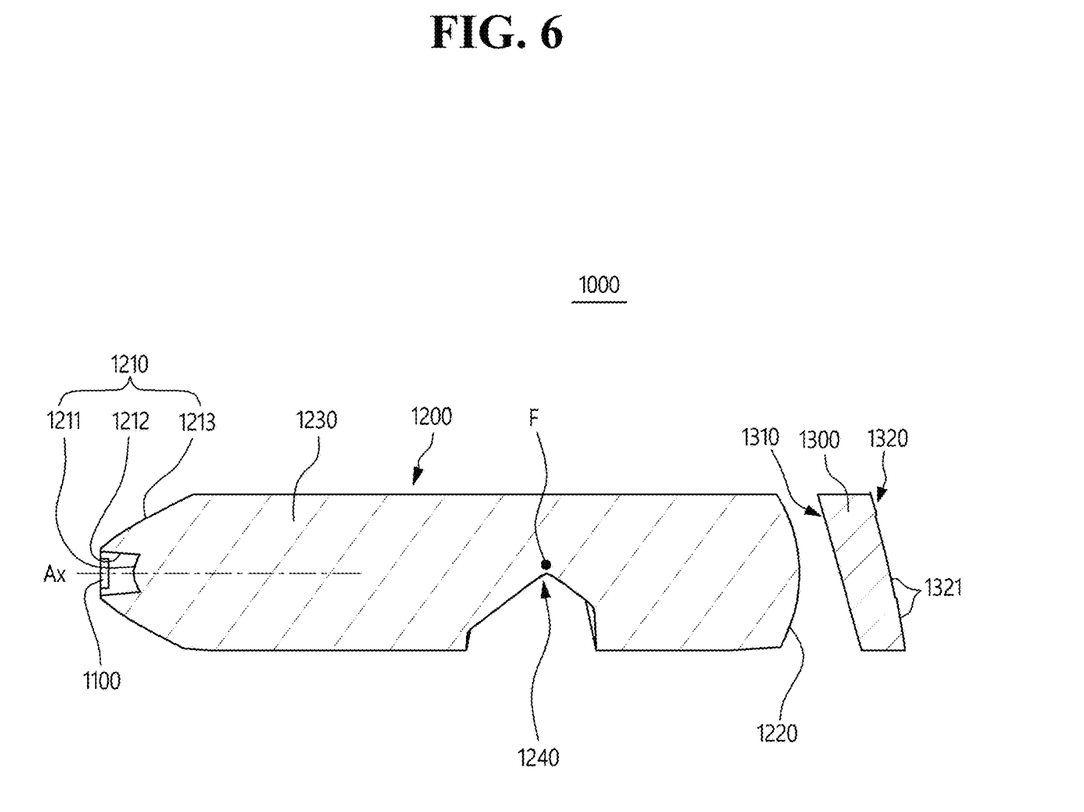
FIG. 6 is a longitudinal cross-sectional view of a lamp module according to an embodiment of the present disclosure.

FIG. 6 is a longitudinal cross-sectional view of a lamp module according to an embodiment of the present invention. FIG. 6 illustrates one of the plurality of lamp modules 1000, and the forthcoming description can readily apply to the remaining lamp modules 1000.

Referring to FIG. 6, a lamp module 1000 may include a light source 1100, an optical guide unit 1200, and an optical lens 1300.

The light source 1100 may emit light with an appropriate color and/or luminous flux suitable for the intended purpose of the vehicle lamp 1. For example, a semiconductor light-emitting device such as a light-emitting diode (LED) may be used as the light source 1100, but the present disclosure is not limited thereto. Various other light sources such as laser diodes (LDs) or bulbs may also be used. Depending on the type of the light source 1100, optical elements such as mirrors, prisms, reflectors, or phosphors may be additionally used.

An optical guide unit 1200 may be disposed in front of the light source 1100 to guide incident light from the light source 1100 toward the optical lens 1300, which is disposed in front of the optical guide unit 1200. The light source 1100 may be disposed with its emission surface facing forward, allowing the light to be incident upon the optical guide unit 1200.

The configuration that the optical guide unit 1200 is disposed in front of the light source 1100, and the optical lens 1300 is disposed in front of the optical guide unit 1200 is based an example that the vehicle lamp 1 emits light forward, but the notion of forward may vary depending on the installation position and direction of the vehicle lamp 1.

The optical guide unit 1200 may include an entrance section 1210, an exit section 1220, and a transmission section 1230. In some embodiments, the optical guide unit 120 may further include a shield section 1240.

The entrance section 1210 may allow incident light from the light source 1100 to be condensed.

The entrance section 1210 may have a central surface 1211, which is centered around an optical axis Ax of the light source 1100, a protruding surface 1212 that protrudes toward the light source 1100 from the edges of the central surface 1211, and a reflective surface 1213 that reflects the light incident on the protruding surface 1212 forward. The reflective surface 1213 may be formed such that its distance from the optical axis Ax of the light source 1100 gradually increases in a direction from its rear end connected to the protruding edge of the protruding surface 1212 to its front end, thereby allowing the light incident upon the protruding surface 1212 to be reflected substantially forward.

The exit section 1220 may allow at least some of the incident light from the entrance section 1210 to exit and enter the optical lens 1300. The exit section 1220 may be formed with a convex shape toward the front to concentrate the exiting light, thereby enabling it to enter the optical lens 1300 with minimal loss.

Since the entrance section 1210 and the exit section 1220 are connected by the transmission section 1230 to form an integral unit, the configuration of the lamp module 1000 can be simplified compared to a case where the entrance section 1210 and the exit section 1220 are separate and installed individually. The light incident upon the entrance section 1210 may be transmitted to the exit section 1220 through the transmission section 1230.

The shield section 1240 may be formed with a concave shape on one side of the transmission section 1230 to obstruct some of the light proceeding to the exit section 1220. In an example where the vehicle lamp 1 generates a low beam pattern, the shield section 1240 may be formed with a concave shape upward on a lower side of the transmission section 1230. In this case, the height of the cutoff line of the low beam pattern generated by the vehicle lamp 1 may be varied depending on the height of an upper part of the shield section 1240.

The shield section 1240, which is disposed with its upper part at or near a rear focus F of the exit section 1220, may obstruct some of the light proceeding from the entrance section 1210 to the exit section 1220, thereby allowing the cutoff line of the low beam pattern to be formed.

However, the surface of the transmission section 1230 where the shield section 1240 is formed is not particularly limited to the above-described configuration and may be varied depending on the beam pattern to be generated by the vehicle lamp 1.

Figure 7:
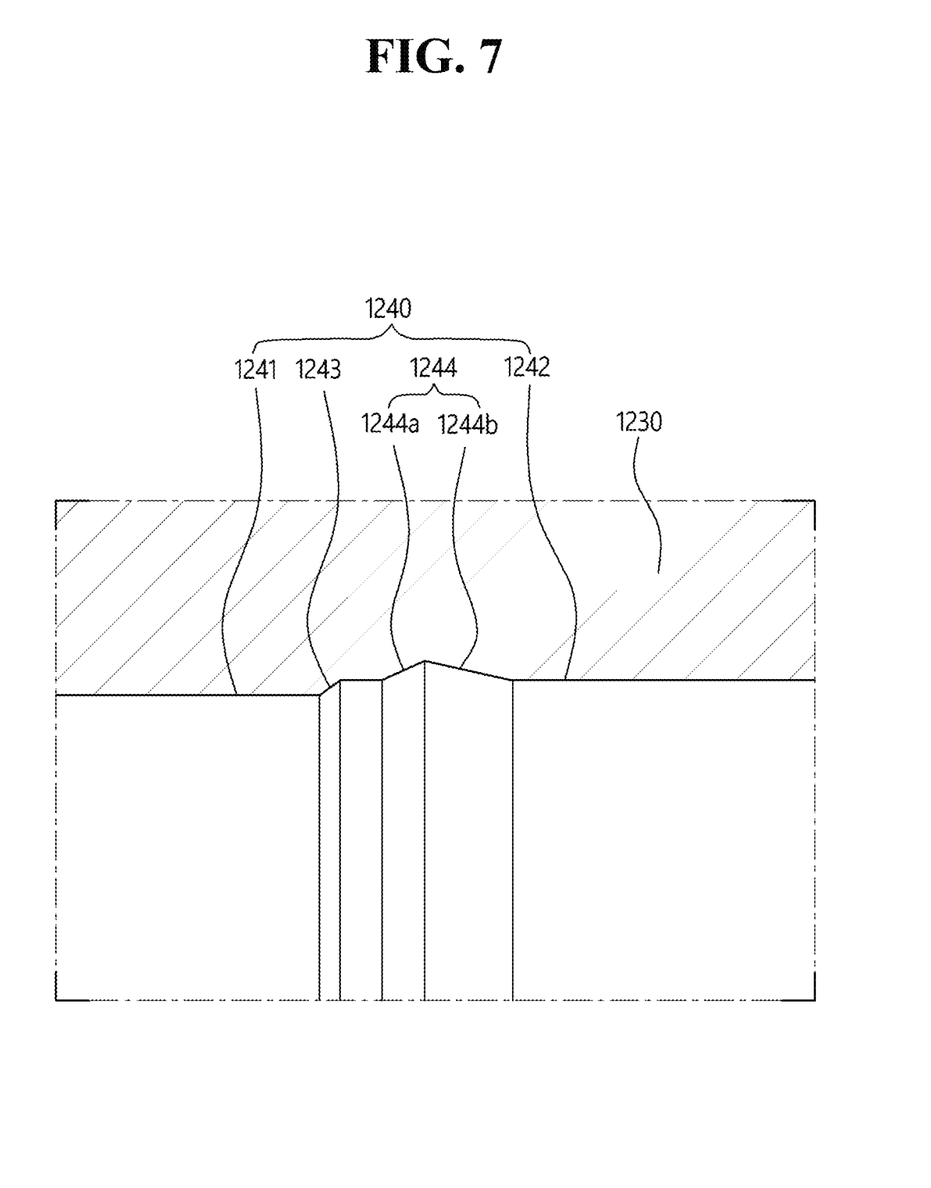
FIG. 7 is a lateral cross-sectional view illustrating an upper part of a shield section according to an embodiment of the present disclosure.
Figure 8:
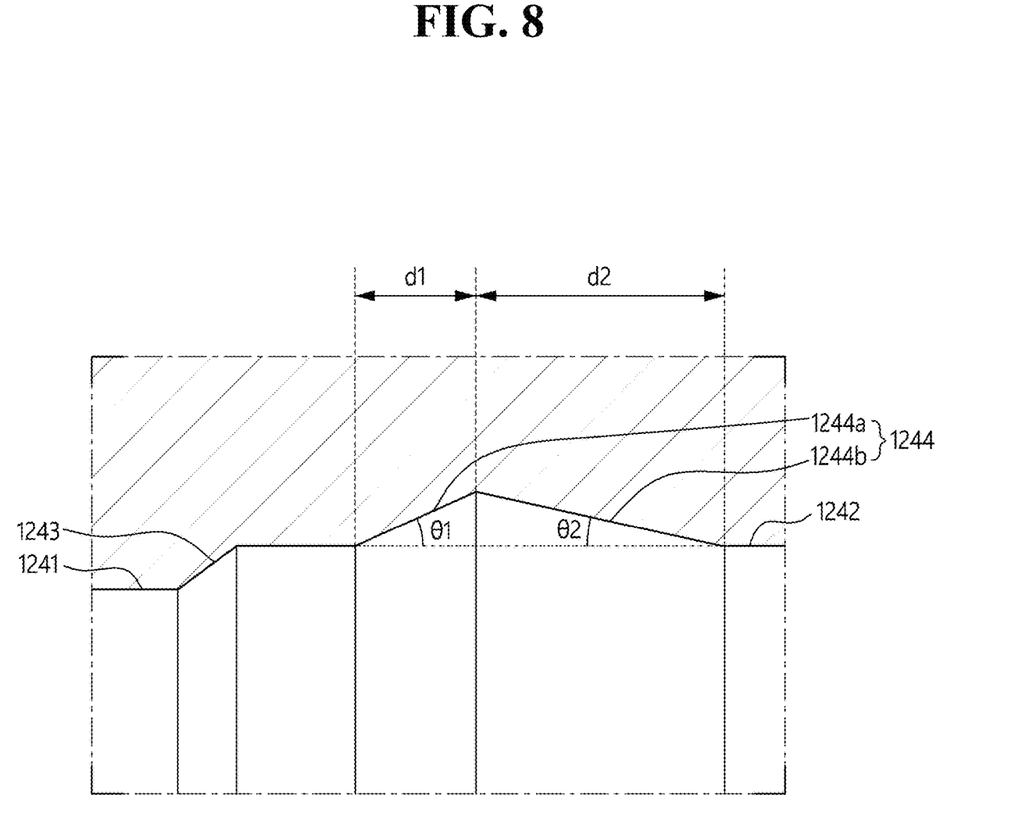
FIG. 8 is an enlarged view of the upper part of the shield section illustrating a protruding portion according to an embodiment of the present disclosure.

FIG. 7 is a lateral cross-sectional view illustrating an upper part of a shield section according to an embodiment of the present disclosure, and FIG. 8 is an enlarged view of the upper part of the shield section illustrating a protruding portion according to an embodiment of the present disclosure.

Referring to FIGS. 7 and 8, the upper part of the shield section 1240 may include a first edge portion 1241 and a second edge portion 1242, which are disposed on both lateral sides of the optical axis Ax of the light source 1100 and have different heights, and a connecting portion 1243, which is between the first edge portion 1241 and the second edge portion 1242. By way of example, the second edge portion 1242 may be disposed higher than the first edge portion 1241.

Figure 9:
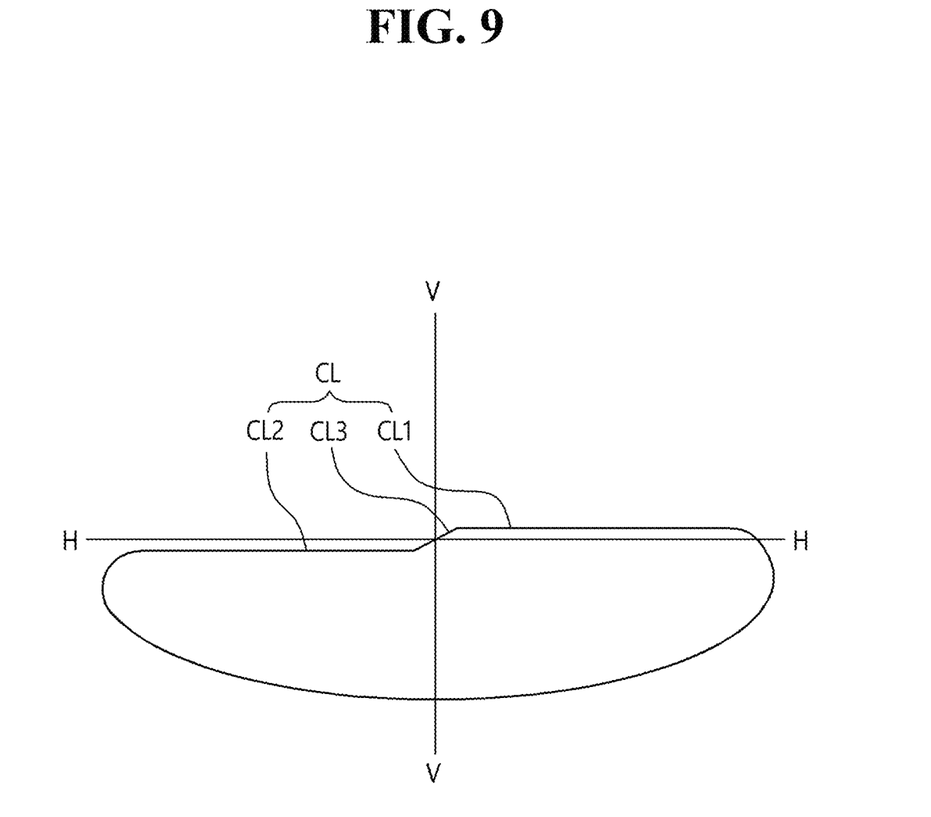
FIG. 9 is a diagram showing a beam pattern generated by the lamp module without a protruding portion according to an embodiment of the present disclosure.

Referring to FIG. 9, when the first edge portion 1241, the second edge portion 1242, and the connecting portion 1243 are formed at the top of the shield section 1240, as described above, a cutoff line CL of a low beam pattern generated by the vehicle lamp 1 may include an upper line CL1 formed by the first edge portion 1241, a lower line CL2 formed by the second edge portion 1242, and a connecting line CL3 formed by the connecting portion 1243 that connects the upper and lower lines CL1 and CL2.

In this case, the upper line CL1 may correspond to the lane that the vehicle is currently driving in, and the lower line CL2 may correspond to an opposing lane. The first and second edge portions 1241 and 1242 may be formed with different heights such that the upper and lower lines CL1 and CL2 may have different heights, but the present disclosure is not limited thereto. In other words, any one of the first and second edge portions 1241 and 1242 may be formed to be higher than the other, or the first and second edge portions 1241 and 1242 may both have the same height, depending on the shape of the cutoff line CL to be formed. No connecting portion may be provided where the first and second edge portions 1241 and 1242 have the same height.

The first and second edge portions 1241 and 1242 may be formed to be substantially parallel to ensure that the upper and lower lines CL1 and CL2 are formed horizontally since a protrusion or recess in either the upper or lower line CL1 or CL2 may result in reduced visibility or occurrence of glare for the driver of an oncoming vehicle.

Further, the shield section 1240 may include a protruding portion 1244, which is formed to protrude upward from the second edge portion 1242. Consequently, referring to FIG. 10, a section S of the lower line CL2, where an oncoming vehicle is disposed, may be depressed, thereby preventing glare for the driver of the oncoming vehicle.

Figure 10:
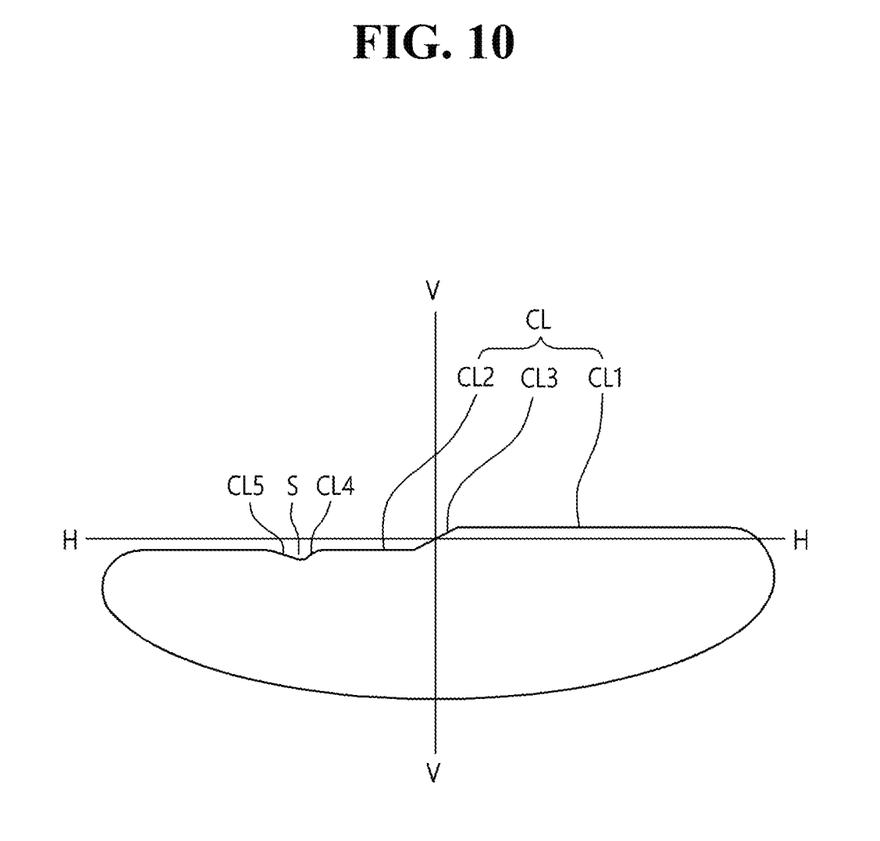
FIG. 10 is a diagram showing a beam pattern generated by the lamp module with a protruding portion according to an embodiment of the present disclosure.

In other words, the lower line CL2, which is formed by the second edge portion 1242, may preferably be formed to be as horizontal as possible, but due to the potential for glare based on the position of the oncoming vehicle, the section S of the lower line CL2 may be recessed, thereby more effectively preventing glare for the driver of the oncoming vehicle.

The protruding portion 1244 may include a third edge portion 1244a and a fourth edge portion 1244b, which are formed along a left-right direction. The third and fourth edge portions 1244a and 1244b may be sloped in opposite directions, i.e., from left to right and from right to left, such that abutting ends thereof are positioned higher than the second edge portion 1242, and the other ends are connected to the second edge portion 1242.

The third edge portion 1244a may form a first inclined line CL4, which slopes downward from its end connected to the lower line CL2, moving away from the connecting line CL3 along the left-right direction, and the fourth edge portion 1244b may form a second inclined line CL5, which slopes upward from its end connected to the first inclined line CL4, moving away from the connecting line CL3 along the left-right direction to be connected to the lower line CL2.

In this case, the third edge portion 1244a may be disposed closer to the connecting portion 1243 compared to the fourth edge portion 1244b. A width d1, in the left-right direction, of the third edge portion 1244a may be narrower than a width d2, in the left-right direction, of the fourth edge portion 1244b. As a result, an inclination angle θ1 of the third edge portion 1244a may be greater than an inclination angle θ2 of the fourth edge portion 1244b with respect to the second edge portion 1242.

If the third and fourth edge portions 1244a and 1244b have the same inclination angle and widths in the left-to-right direction, abrupt shifts may emerge in the section S of the lower line CL2, instigating a sense of incongruity. To alleviate this, the third edge portion 1244a may be formed to have a smaller inclination angle yet a greater length compared to the fourth edge portion 1244b. As a result, the section S of the lower line CL2 can transition more gently and naturally, and the sense of incongruity can be reduced.

The optical lens 1300 may be configured such that the incident light that is guided by the optical guide unit 1200 enters through an entrance surface 1310 and exit through an exit surface 1320, thereby forming a beam pattern suited to the intended purpose of the vehicle lamp 1.

The exit surface 1320 of the optical lens 1300 may be divided into a plurality of facets 1321, and the shape, size, inclination angle, and curvature of each of the facets 1321 may be determined based on the distribution characteristics of the beam pattern to be formed by the lamp module 1000, i.e., the location, size, shape, and brightness of the area where light is projected by the lamp module 1000.

Meanwhile, the relative positions of the optical guide unit 1200 and the optical lens 1300 in each of the lamp modules 1000 may be variously arranged depending on the body lines of the vehicle.

Specifically, the vehicle lamp 1 may reside within the internal space formed by a lamp housing and an outer lens that is coupled to the lamp housing. The outer surface shape of the outer lens, which shapes parts of the body contour of the vehicle, may not adopt a flat shape facing the front of the vehicle. Instead, the outer lens may be inclined or curved in at least one direction from one side to the other side of the vehicle. In this case, the vehicle lamp 1 may be arranged along the shape of the outer lens.

For example, if the outer lens is configured to be disposed more forward as it descends from the top to the bottom of the vehicle lamp 1, as illustrated in FIG. 3, the optical guide unit 1200 in each of the lamp modules 1000 may also be formed with a greater length in a front-rear direction, descending from the top to the bottom of the vehicle lamp 1. Similarly, the optical lens 1300 in each of the lamp modules 1000 may be tilted such that the bottom thereof is disposed more forward than the top thereof.

Assuming that the positions of the entrance portions 1210 of the lamp modules 1000 are identical (i.e., aligned flush vertically), the exit portions 1220 of the lamp modules 1000 may be disposed more forward, descending from the top to the bottom of the vehicle lamp 1. Consequently, the optical guide units 120 of the lamp modules 1000 may also become longer in the front-rear direction, descending from the top to the bottom of the vehicle lamp 1.

Furthermore, as illustrated in FIG. 4, in a case where the outer lens is formed to be positioned clear to the rear in a direction from the inner side to the outer side of the vehicle as well as in a direction from the bottom to the top, the optical guide units 1200 of the lamp modules 1000 may also be disposed closer to the inner side of the vehicle along the left-right direction, descending from the top to the bottom of the vehicle lamp 1. Similarly, the optical lenses 1300 of the lamp modules 1000 may also be tilted such that the inner side of optical lenses 1300 is disposed more forward than the outer side thereof.

To simplify the configuration of the lamp modules 1000, the plurality of lamp modules 1000 may be integrally formed. In this case, the light sources 1100 of the lamp modules 1000 may be installed on a common substrate, and the optical guide units 1200 and the optical lenses 1300 of the lamp modules 1000 may be integrally formed with each other.

When the optical lenses 1300 of the lamp modules 1000 are integrally formed, the entrance surfaces 1310 of the optical lenses 1300 of the lamp modules 1000 may form a continuous and smooth surface without steps (e.g., ridges, articulations, or lines) formed therebetween. In this case, control of optical paths can be facilitated more easily.

A case where the lamp modules 1000 are integrally formed in a vertical direction based on the arrangement direction of the lamp modules 1000 will hereinafter be described. In this case, the lamp modules 1000 may be collectively assembled together, thereby simplifying the entire assembly process.

Figure 11:
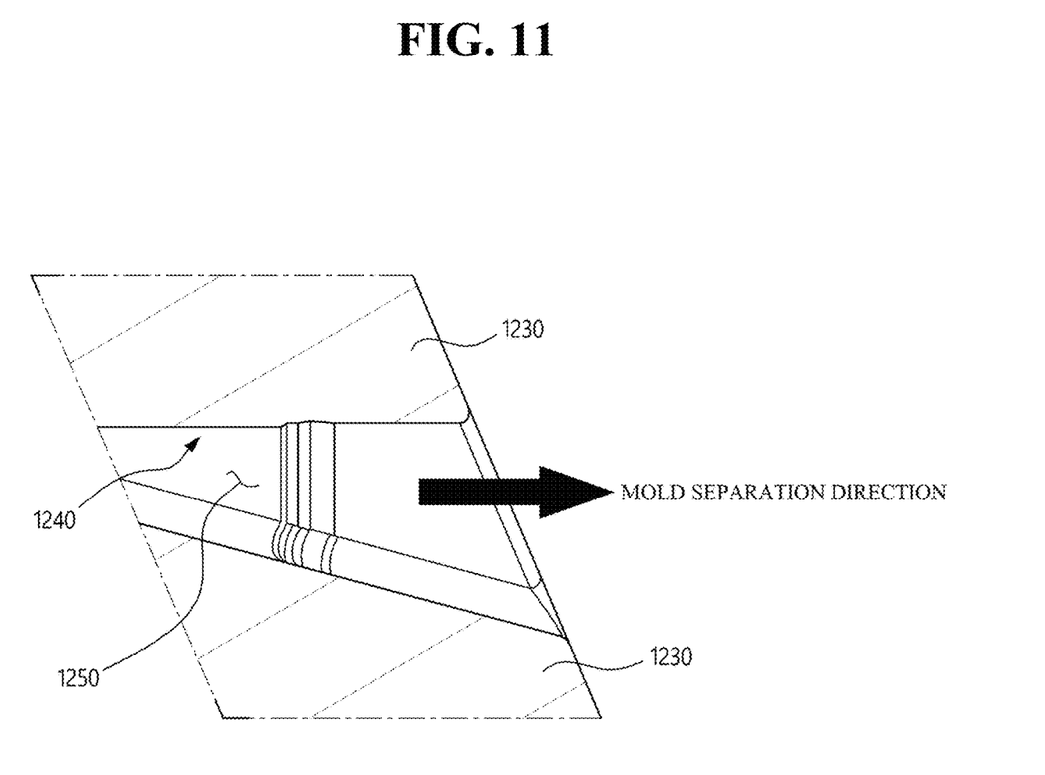
FIG. 11 is a cross-sectional view illustrating an aperture according to an embodiment of the present disclosure.

FIG. 11 is a cross-sectional view illustrating an aperture according to an embodiment of the present disclosure.

Referring to FIG. 11, in a case where the optical guide units 1200 of the lamp modules 1000 are integrally formed, an aperture 1250 may be formed between adjacent optical guide units 1200 to form the shield sections 1240. The width of the aperture 1250 may gradually increase along the left-right direction in consideration of the direction where a mold for forming the aperture 1250 is separated.

In other words, if the width of the aperture 1250 increases in the opposite direction to the direction where the mold is separated, the mold may not be able to be easily separated. Thus, by increasing the width of the aperture 1250 in the direction where the mold is separated, any undercuts can be prevented during the separation of the mold.

As mentioned earlier, as the light sources 1100, the optical guide units 1200, and the optical lenses 1300 of the lamp modules 1000 may be integrally formed, the number of components of the vehicle lamp 1 may be reduced, and the assembly of the vehicle lamp 1 may be simplified.

Furthermore, as the shield section 1240 of each of the lamp modules 1000 includes the first edge portion 1241, the second edge portion 1242, the connecting portion 1243, and the protruding portion 1244, the section S of the lower line CL2 formed by the second edge portion 1242 where an oncoming vehicle is disposed can be depressed, thereby preventing glare for the driver of the oncoming vehicle.

In concluding the detailed description, those skilled in the art will appreciate that many variations and modifications can be made to the exemplary embodiments without substantially departing from the principles of the present disclosure. Therefore, the disclosed exemplary embodiments are used in a generic and descriptive sense only and not for purposes of limitation.

What is claimed is:

1. A vehicle lamp comprising a plurality of lamp modules to generate a beam pattern therewith,
    wherein the plurality of lamp modules are arranged in one direction, and
    wherein each of the plurality of lamp modules comprises:
        a light source that generates light;
        an optical guide unit, which guides the light incident from the light source to be emitted forward; and
        an optical lens, which transmits the light incident from the optical guide unit therethrough to allow the beam pattern to be generated,
    wherein the optical guide unit comprises:
        an entrance section, through which the light is incident from the light source;
        an exit section, which is disposed in front of the entrance section to allow at least some of the light incident upon the entrance section to exit;
        a transmission section, which transmits the light incident upon the entrance section to the exit section; and
        a shield section, which is formed with a concave shape on a bottom surface of the transmission section,
    wherein an upper part of the shield section is disposed at or near a rear focal point of the exit section, and the upper part of the shield section includes:
        a first edge portion and a second edge portion, which are formed with different heights on both sides of an optical axis of the light source;
        a connecting portion, which connects the first edge portion and the second edge portion; and
        a protruding portion, which protrudes upward from the second edge portion and includes a third edge portion and a fourth edge portion, which are arranged in a left-right direction,
    wherein the third edge portion is disposed closer than the fourth edge portion to the connecting portion, and
    wherein the third edge portion and the fourth edge portion are sloped such that their abutting ends are disposed higher than the second edge portion, and the other ends are connected to the second edge portion.

2. The vehicle lamp of claim 1, wherein the entrance section comprises:
    a central surface, which is centered around an optical axis of the light source;
    a protruding surface, which protrudes toward the light source from edges of the central surface; and
    a reflective surface, which reflects at least some of light incident on the protruding surface forward.

3. The vehicle lamp of claim 1, wherein the exit section has a convex shape toward the front of the vehicle lamp.

4. The vehicle lamp of claim 1, wherein the optical guide units of the plurality of lamp modules are integrally formed, and
    wherein an aperture is formed between the optical guide units of adjacent lamp modules among the plurality of lamp modules for forming the shield section.

5. The vehicle lamp of claim 4, wherein a width of the aperture gradually increases in a left-right direction.

6. The vehicle lamp of claim 1, wherein the first edge portion and the second edge portion are formed horizontally.

7. The vehicle lamp of claim 1, wherein the fourth edge portion is formed to be wider than the third edge portion in the left-right direction.

8. The vehicle lamp of claim 1, wherein an inclination angle of the third edge portion is greater than an inclination angle of the fourth edge portion with respect to the second edge portion.

9. The vehicle lamp of claim 1, wherein the optical lenses of the plurality of lamp modules are integrally formed to form a continuous entrance surface without steps formed across the continuous entrance surface.

10. The vehicle lamp of claim 1, wherein longitudinal lengths of the optical guide units of the plurality of lamp modules increase along the one direction in which the plurality of lamp modules are arranged.

11. The vehicle lamp of claim 1, wherein the one direction in which the plurality of lamp modules are arranged is a vertical direction.

12. The vehicle lamp of claim 1, wherein at least one of the optical guide units of the plurality of lamp modules has a different position in a left-right direction from at least one other of the optical guide units of the plurality of lamp modules.

13. A vehicle lamp comprising a plurality of lamp modules to generate a beam pattern therewith, wherein each of the plurality of lamp modules comprises:
    a light source that generates light;
    an optical guide unit, which guides the light incident from the light source to be emitted forward; and
    an optical lens, which transmits the light incident from the optical guide unit therethrough to allow the beam pattern to be generated,
    wherein the optical guide unit comprises:
        an entrance section, through which the light is incident from the light source;
        an exit section, which is disposed in front of the entrance section to allow at least some of the light incident upon the entrance section to exit;
        a transmission section, which transmits the light incident upon the entrance section to the exit section; and
        a shield section, which is formed with a concave shape on a bottom surface of the transmission section,
    wherein the plurality of lamp modules are arranged along a vertical direction, and
    wherein an aperture is formed between the optical guide units of adjacent lamp modules among the plurality of lamp modules for forming the shield section.

14. The vehicle lamp of claim 13, wherein the entrance section comprises:
    a central surface, which is centered around an optical axis of the light source;
    a protruding surface, which protrudes toward the light source from edges of the central surface; and
    a reflective surface, which reflects at least some of light incident on the protruding surface forward.

15. The vehicle lamp of claim 13, wherein the optical guide units of the plurality of lamp modules are integrally formed.

16. The vehicle lamp of claim 13, wherein a width of the aperture gradually increases in a left-right direction.

17. The vehicle lamp of claim 13, wherein an upper part of the shield section is disposed at or near a rear focal point of the exit section and includes:
   a first edge portion and a second edge portion, which are formed horizontally with different heights on both sides of an optical axis of the light source;
   a connecting portion, which connects the first edge portion and the second edge portion; and
   a protruding portion, which protrudes upward from the second edge portion and includes a third edge portion and a fourth edge portion, which are arranged in a left-right direction,
   wherein the third edge portion is disposed closer than the fourth edge portion to the connecting portion, and
   wherein the third edge portion and the fourth edge portion are sloped such that their abutting ends are disposed higher than the second edge portion, and the other ends are connected to the second edge portion.

18. The vehicle lamp of claim 13, wherein the optical lenses of the plurality of lamp modules are integrally formed to form a continuous entrance surface without steps formed across the continuous entrance surface.

19. The vehicle lamp of claim 13, wherein longitudinal lengths of the optical guide units of the plurality of lamp modules increase along the one direction in which the plurality of lamp modules are arranged.

20. The vehicle lamp of claim 13, wherein at least one of the optical guide units of the plurality of lamp modules has a different position in a left-right direction from at least one other of the optical guide units of the plurality of lamp modules.

* * * * *